United States Patent [19]

Moodie

[11] 4,255,025
[45] Mar. 10, 1981

[54] METHOD AND APPARATUS FOR COVERING SEALING SURFACE ON SEALING DEVICE OF FILM CASSETTE PROCESSOR

[75] Inventor: Donald E. Moodie, Marblehead, Mass.

[73] Assignee: Polaroid Corporation, Cambridge, Mass.

[21] Appl. No.: 67,900

[22] Filed: Aug. 20, 1979

[51] Int. Cl.³ .............................................. G03C 11/00
[52] U.S. Cl. .................................. 352/130; 352/78 R
[58] Field of Search ........................ 352/130, 72, 78 R

[56] References Cited

U.S. PATENT DOCUMENTS

| | | | |
|---|---|---|---|
| 3,895,862 | 7/1975 | Stella et al. | 352/130 |
| 3,951,530 | 4/1976 | Czumak et al. | 352/130 |
| 4,027,956 | 6/1977 | Stella et al. | 352/130 |

*Primary Examiner*—Monroe H. Hayes
*Attorney, Agent, or Firm*—Leslie J. Payne

[57] ABSTRACT

Method and apparatus for covering a sealing surface of a sealing strip which releasably seals processing fluid in a film cassette contained fluid processor. The apparatus includes a flap portion connected to the sealing strip in a manner which enables the flap to overlie the sealing surface when a leading end of the strip connects to and moves with a strip of film during rewinding of the film onto a film spool so as to effect release of the processing fluid.

8 Claims, 4 Drawing Figures

METHOD AND APPARATUS FOR COVERING SEALING SURFACE ON SEALING DEVICE OF FILM CASSETTE PROCESSOR

BACKGROUND OF THE INVENTION

This particular invention relates generally to film processing and, more particularly, it concerns a method and photographic film cassette having an improved system for releasing processing fluid from a processing fluid applicator.

Multipurpose film cassettes for use in the motion picture art have been developed in which a strip of photographic film is selectively and sequentially operated to be exposed, processed and projected while at all times remaining in the cassette. Film cassettes of this type are disclosed in several U.S. Patents assigned in common with the present invention.

Typically, such cassettes contain a supply of light-sensitive photographic film. For selectively exposing the film, the cassette is placed in a camera particularly adapted to receive and operate the same. Processing or developing of the exposed film to provide the conventional series of positive transparent image frames is achieved by placing the cassette in a player or processing and viewing apparatus. This player apparatus activates a cassette contained fluid processor for effecting deposition of processing fluid for developing the latent images on the exposed emulsion surface while the latter is advancing therepast. Following processing as indicated above, the player apparatus is operated as a projector. During the projecting mode, the film is incrementally advanced, frame-by-frame, past a light source. In this manner, the transparent images of the scenes to which the film were exposed are capable of being successively viewed while being projected onto a screen.

The advance in the motion picture art represented by such a system is apparent and needs no elaboration herein. However, for satisfactory cassette performance it is vital that desposition of the processing fluid be reliably controlled. Otherwise, incomplete and non-uniform coatings may arise thereby possibly adversely affecting achievement of a uniform diffusion transfer on the film strip as well as possible contamination of cassette components. It follows, therefore, that the achievement of controlled fluid release onto the film strip during processing has been a major focal point of attention in overall system development.

The current state of the art with respect to achieving the appropriate release of the processing fluid on such cassette contained film strip is represented by the disclosures of U.S. Pat. No. 3,895,862 issued July 22, 1975, to Joseph A. Stella, Edward F. Burke, Jr. and Paul B. Mason; and U.S. Pat. No. 3,951,530 issued Apr. 20, 1976, to Frank M. Czumak, Paul B. Mason and Joseph A. Stella; all of which patents are commonly assigned with the present invention.

In cassettes of the foregoing category, the processing fluid is stored in a closed reservoir or pod positioned within the film cassette. Use is made of a removable tear-tab closure for ensuring releasable retention of the stored fluid. In this regard, the tear-tab is releasably bonded to the reservoir to seal completely the reservoir opening. For effecting opening of the reservoir opening, the tear-tab is provided with a folded back portion trained over a guide roller and connected to and movable with a pull strip. Opening commences when a latching tongue of the pull strip engages and moves with an aperture in the leader end of the film during rewinding of the exposed film strip back to the supply spool. Continued rewinding will produce a pulling displacement on the pull strip. This displacement is translated into corresponding displacement of the tear-tab. By virtue of the configuration and connection of the tear-tab, it will be peeled from the reservoir opening to thereby allow flow of the processing fluid through a processor nozzle opening onto the film strip.

In systems of this general type, separation and storage of the tear-tab from the pull strip is necessary for avoiding having the tear-tab, which is wet with processing fluid, from contaminating dry portions of the film strip as well as other cassette components. Towards this particular end, the art teaches that the tear-tab closure is separated by a knife-like formation. This formation is at the exit of a channel formed by internal cassette walls which walls also form a storage chamber for the separated tear-tab. While the foregoing approach is successful in operation, it nevertheless requires a relatively large number of components and is subject to potential problems associated with the separation and subsequent storage of the wet tear-tab. More particularly, the tab may accidentally leave a storage chamber after separation, stick in the internal passages and if required to be displaced by pushing would have a tendency to buckle due to its thin and wet characteristics. Because of such potential, there is need for improvement in preventing the wet tear-tab from adversely affecting the film strip and the cassette components as well as an approach requiring fewer components for purposes of reducing costs.

Moreover, the problems of achieving a simple and controlled release of the processing fluid in a manner which avoids processing fluid contamination are further compounded by the requirement that each once used cassette carry its own processor. Moreover, the cassette and its components, including the processor, must be capable of mass production manufacturing techniques and the tolerance levels incident to such techniques for the system to be acceptable in a competitive commercial market. Accordingly, the structural organization of the means by which the processing fluid is released for deposition onto the film is critical to the overall system in which the cassette is used.

SUMMARY OF THE INVENTION

In accordance with the present invention, the aforenoted potential for problems associated with conventional tear-tab/pull tab release of processing fluid from a sealed reservoir of a cassette contained fluid applicator are substantially eliminated. Elimination is achievable by the provision of an improved integral sealing strip for releasing processing fluid while allowing winding of the strip with the film on a spool and substantially avoiding contamination by the processing fluid.

As in prior fluid processors for use in film cassettes containing a strip of photographic film movable in a given direction in accordance with winding of the film strip on a film spool, the processor has an opening allowing passage of the fluid for deposition onto the film strip. For releasing the fluid, there is provided a releasable sealing strip having a sealing surface releasably sealing the processor opening and having a leading end connectable to the film strip for movement therewith so as to release the fluid and carry the sealing strip into the spool winding for storage.

In an illustrated embodiment, a flap portion is connected to the sealing strip in a manner to overlie the sealing surface as the sealing strip is drawn toward the film spool so as to cover the sealing surface when the sealing strip is convolutely wound with the film strip. This precludes the processing fluid carried by the sealing surface from adversely affecting the film strip.

The method of this invention is for releasing processing fluid from a fluid processor reservoir containing processing fluid and having a sealable area sealed by a sealing surface of a displaceable sealing strip which releases the fluid onto a surface of a photographic film strip in a film cassette in response to a predetermined displacement of the sealing means in a given direction to uncover the sealing surface from the opening. The improvement of this method is in the step of substantially covering the uncovered sealing surface of the sealing means during displacement of the sealing means in the given direction. This step is performed by a cover member connected to the sealing means in a manner which causes the cover to progressively engage and cover the sealing surface.

Among the objects of the invention are, therefore, the provision of an improved sealing strip which automatically covers a sealing surface of the strip after release of the fluid from a fluid opening covered by the surface; the provision of an improved fluid processor having a reservoir containing processing fluid and releasably sealed by the sealing strip of the type indicated above; the provision of an improved photographic film cassette having a fluid processor and the improved releasable sealing strip of the type noted; and the provision of an improved method whereby the sealing surface of a sealing strip, which seals a fluid processing opening of a cassette contained, is covered during the releasing movement of the strip so that the sealing surface may be convolutely wrapped with photographic film strip on a film spool without contaminating it.

Other objects and further scope of applicability of the present invention will become apparent from the detailed description to follow when taken in conjunction with the accompanying drawings wherein like parts are designated by like reference numerals throughout the several views.

BRIEF DESCRIPTION OF THE DRAWINGS

FIG. 4 is an enlarged perspective view illustrating the sealing strip of this invention.

DETAILED DESCRIPTION OF THE PREFERRED EMBODIMENT

Figure 1:
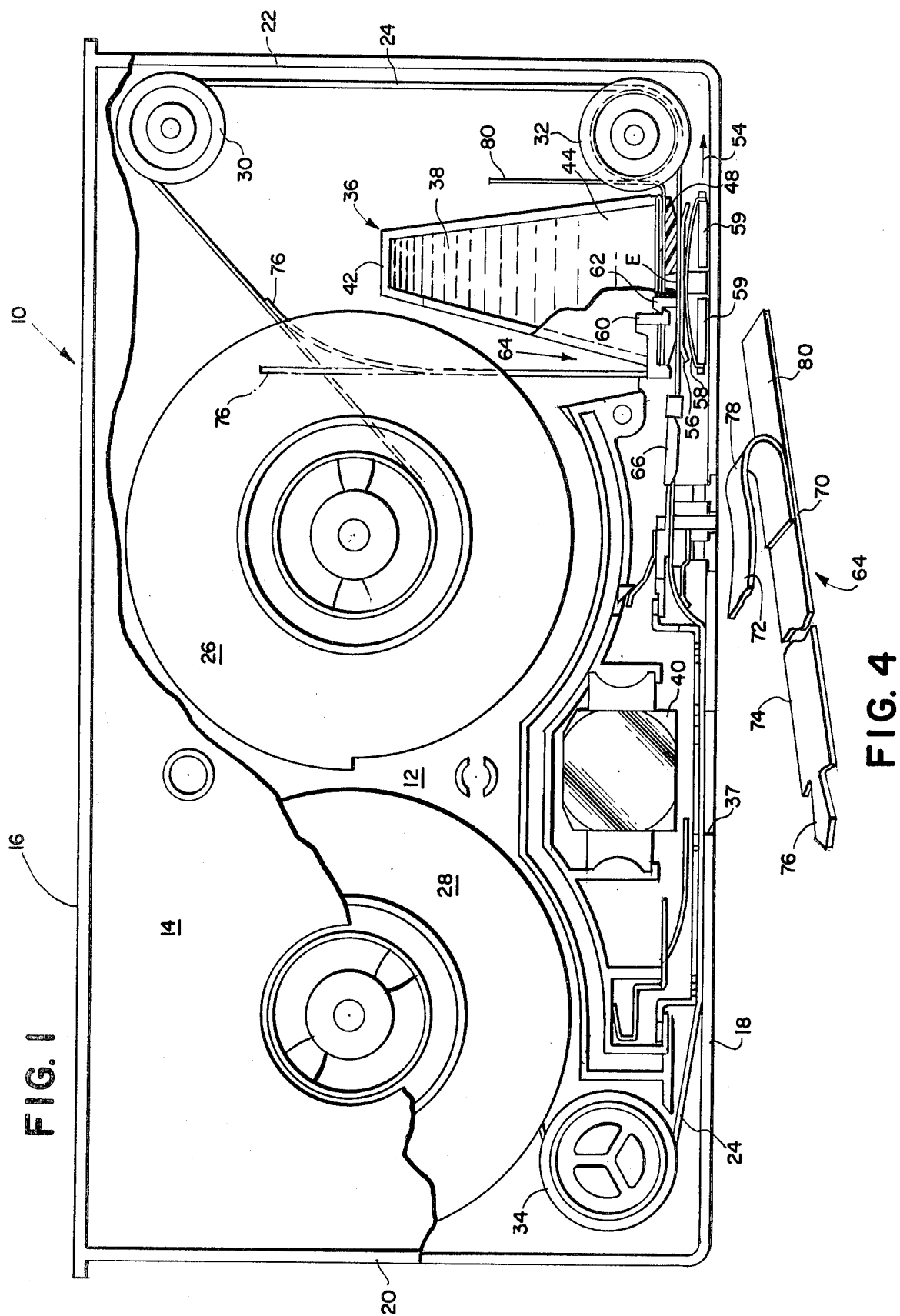
FIG. 1 is a side elevational view partially broken away and partially in cross-section, illustrating the interior of a photographic film cassette incorporating the improved sealing strip of the present invention.

In FIG. 1 of the drawings a multipurpose film cassette incorporating the present invention is shown to include a cassette housing generally designed by the reference numeral 10.

In this embodiment, the cassette housing 10 takes the form of a rectangular parallelepiped having a pair of exterior side walls 12 and 14 connected together by top, bottom and end walls 16, 18, 20 and 22, respectively. Within the housing 10, a film strip 24 is connected at opposite ends to supply and take-up spools 26 and 28, respectively. The film strip 24 is guided for movement through a series of linear flights or runs defined by a bobulator roller 30, idler or guide roller 32 and snubber roller 34. When the film strip 24 runs between the guide roller 32 and snubber roller 34, it traverses a processor 36 and an exposure/projection aperture 37 formed in the bottom housing wall 18 under a reflecting prism 40 located adjacent ventilating openings (not shown) in the side wall 12. The processor 36 retains the processing fluid 38 in a hollow housing 42 connected to the cassette housing 10. A processor opening 44 is formed in the bottom of the housing 42 for allowing flow of the processing fluid 38 therethrough. Also, the housing 42 includes a recessed area 46 sized and shaped to removably receive the applicator nozzle 48 for limited vertical movement therein.

In this embodiment, the nozzle 48 is made of an integrally molded synthetic resinous material. Extending from top to bottom through the nozzle 48 is a generally rectangular shaped nozzle opening 50 in fluid communication with the processor opening 44. Through the opening 50 the processing fluid is deposited onto the emulsion layer E of the film strip 24. The nozzle 48 is also formed with a sloped doctoring surface 52. The doctoring surface 52 is located downstream of the nozzle opening 50, in the context of film strip advancement in the processing or rewind direction (indicated by arrow 54).

For facilitating spreading the fluid substantially uniformly across the emulsion layer E between the longitudinal margins of the film strip 24, the doctoring surface 52 is spaced above the layer E in a preselected manner and by a preselected distance. Due to the relationship of the doctoring surface 52 with respect to the film strip 24, a desired positive hydrodynamic pressure gradient in the processing fluid traveling therepast which increases in the rewind direction 54 of film strip advancement can be developed. Towards this end, there is provided a pressure pad 56 upwardly biased by a pressure pad biasing spring 58. Details regarding the biasing spring 58 as well as the associated supports 59 are the subject matter of copending application U.S. Ser. No. 26,908, filed on Apr. 4, 1979; now U.S. Pat. No. 4,188,098 issued on Feb. 12, 1980 and assigned in common with the present invention. Accordingly, only these aspects necessary for an understanding of this invention will be discussed. To maintain the desired gap spacing, the spring 58 is specifically constructed to upwardly urge the film strip 24 so that the emulsion layer E slidably engages with preselected portions of the underside of the nozzle 48.

Also, since the spring 58 provides a net balance of forces on the film strip 24 foreign particles, such as dust or the like, on the emulsion layer E effect a slight instantaneous increase in the spacing between the doctoring surface 52 and such emulsion layer. Thus, these foreign particles are able to pass beneath the doctoring surface 52 so as to avoid causing wakes in the processing fluid layer.

With continued reference to the housing 42, a latching finger 60 depends downwardly from a lateral side thereof for selective cooperation with an upwardly protruding latch finger 62 on the vertically movable nozzle 48. Normally, interposed between the housing 42 and the nozzle 48 is the improved sealing device or strip 64 of this invention.

Figure 3:
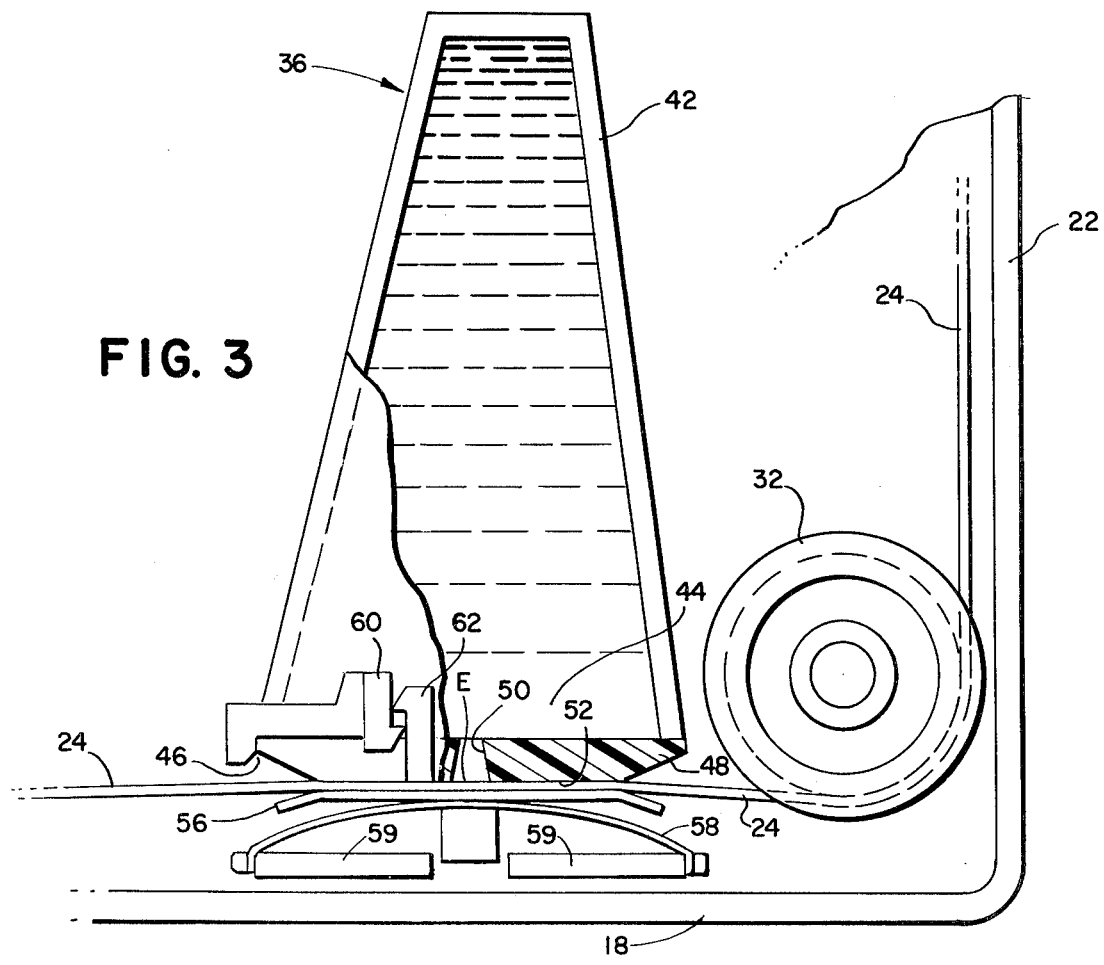
FIG. 3 is an enlarged diagrammatic view of the fluid processor with the sealing strip removed.

As best shown in FIG. 1, when the fluid processor 36 is unactuated, the sandwiched sealing strip 64 forces the latch finger 60 into engagement with the latch finger 62. Removal of the sealing device 64 in the manner to be described permits the nozzle 48, under the influence of the spring 58, to rise and cause disengagement of the latch fingers 60 and 62, while allowing a seal tight engagement of the top of the nozzle 48 with the bottom of the housing 42. See FIG. 3. Thus, the processing fluid is allowed to flow through the nozzle opening 50 from the housing 42. Details regarding the structure and operation of the processor 36 including the housing 42 and nozzle 48 do not form an aspect of this invention, but form the basis of a copending application Ser. No. 108,521 filed Dec. 31, 1979, entitled Multipurpose Film Handling Cassette Having a Modular Film Processor, of Joseph A. Stella; which is assigned in common with this application.

Positioned upstream of the nozzle 48 in the context of the rewind direction 54 is a valve member 66. For advancing the valve member 66 from the position shown to a position not shown, underlying the nozzle 48 at the end of the processing cycle, it is engagable by a necked-down portion (not shown) in the leading end portion of the film strip 24 during rewind in the processing mode.

Reference is now made to FIGS. 1-4, for purposes of more clearly describing the improved sealing strip 64 of this invention. As depicted, it includes a generally elongated main strip member 70 having attached to an intermediate portion thereof a folded sealing member 72. An end portion 74 of the sealing strip 64 extends upwardly towards the film strip 24 and has a tapered down latching tongue 76. Such tongue 76 is sized and shaped for engagement with a bottle-shaped aperture (not shown) in the supply end leader of the film strip 24. Such engagement occurs upon initial rewind movement of the film strip 24 back onto the supply spool 26.

In this context, it will be pointed out that the position of the noted bottle-shaped aperture is such that it will be at or past the tongue 76 when the film strip 24 has traveled fully from the supply spool 26 to the take-up spool 28 after exposure. Engagement of the sealing strip 64 is enhanced by the fact that it is made of an inherently resilient material, such as a polyester, like Mylar or some other material having physical characteristics comparable to Mylar.

As shown in FIG. 1, the latching tongue 76 is bent and bears against the underside of the film strip 24. The noted inherent resiliency creates a tendency for the latching tongue 76 to restore itself to an initially straight condition. Thus, the tongue continues to bear against the film strip 24 during movement of the latter in the exposure mode as it travels from the supply spool 26 to the take-up spool 28. Whenever the latching tongue 76 is displaced into the bottle-shaped aperture, it assumes a straight condition therethrough. Continued rewinding of the film strip 24 will cause bending and positive anchoring of the tongue 76 to the film strip. As a result, the sealing strip 64 can be displaced during rewinding on the supply spool 26. Thus, the sealing strip 64 becomes interleaved between the convolutions of the film strip 24 as the film strip is wound upon the supply spool 26.

Figure 2:
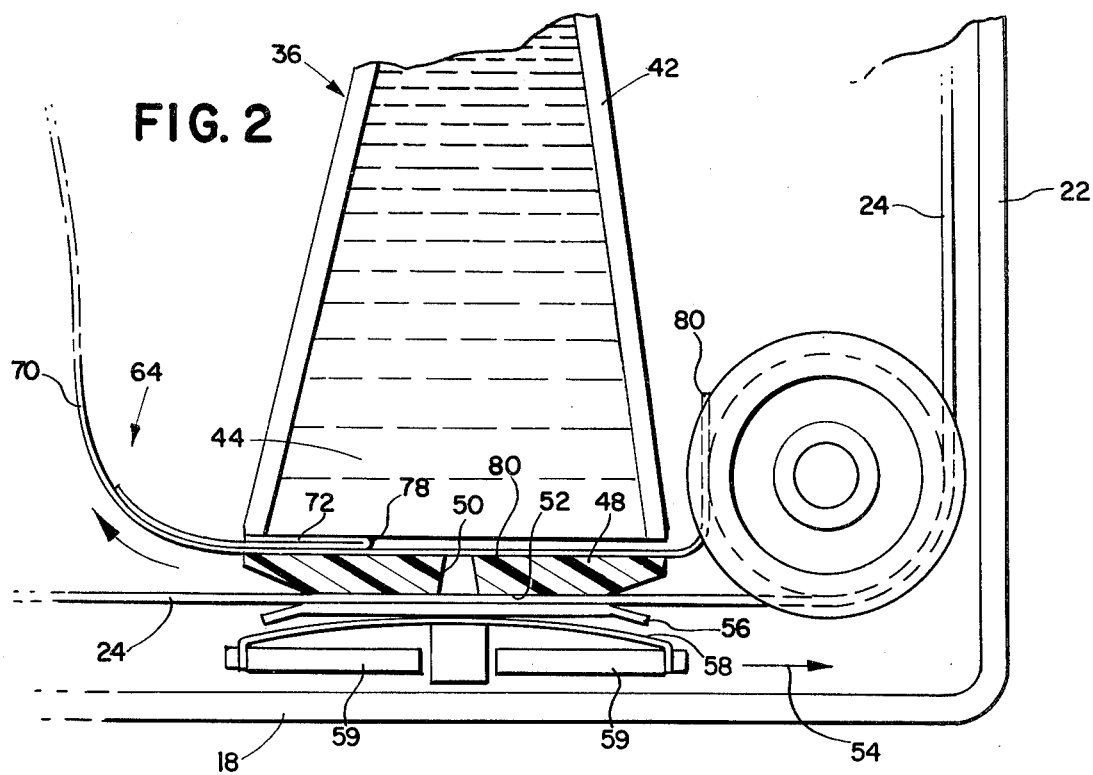
FIG. 2 is an enlarged diagrammatic view better illustrating details of the fluid processor shown in FIG. 1 with portions removed for clarity and the improved sealing strip in the process of releasing the processing fluid from the reservoir.

In this embodiment, the sealing member 72 is made of bendable and peelable material. One end of the sealing member 72 is attached as by any suitable means including adhesive bonding, fusing or the like, to an intermediate portion of the sealing strip 64. A sealing surface 78 is formed on the folded sealing member 72 for releasable engagement with the bottom of the housing 42 to prevent fluid flow. In this embodiment, the sealing member 72 is made of a fluid impervious material such as lead having superimposed thereon a layer of suitable thermoplastic material (not shown) and an appropriate adhesive material for releasably engaging the bottom of the housing 42. The sealing member 72 is constructed in a manner similar to the tear-tab described in the previously noted patents. Since the sealing member 72 is folded in the manner depicted, it will be appreciated that pulling displacement of the sealing strip 64 will cause such sealing member to peel progressively from the bottom of the housing 42. This action is best depicted in FIG. 2. Owing to this opening movement, the processing fluid 38 will be free for flow through the processor opening 44 and the nozzle opening 50 onto the film strip 24.

Extending beyond the flap portion 72 is a cover tab portion 80 which may form an integral part of the strip member 70. In the illustrated embodiment, the cover tab 80 is appropriately sized and shaped to cover the sealing surface 78. In this manner, wet portions of the sealing surface 78 will be precluded from contacting portions of the cassette and, in particular, the film strip 24 when being convolutely wound on the supply spool. This, of course, advantageously avoids the necessity of having the folded sealing member 72 separated and then stored in the extremely compact cassette. Thus, the difficulty in accurately controlling displacement of a separated and extremely thin, bendable and wet sealing member 72 is obviated.

To provide a more complete understanding of the operation of the sealing strip 64, the overall operation of the cassette will now be explained briefly. Prior to exposure, the film strip 24 is essentially wound on the supply spool 26. A leader of this film strip 24 extends about the rollers 30, 32 and 34 to the take-up spool 28. The cassette housing 10 is constructed to be removably placed within a camera (not shown) which is adapted to receive and operate the same. For selectively exposing the film strip 24, the camera is operated to advance incrementally the film strip 24 past the exposure/projection aperture 37 to the take-up spool 28. After exposure, the cassette housing 10 is removed from the camera and subsequently inserted into a player apparatus. As mentioned earlier, this player apparatus is equipped with means cooperable with the various operating components of the cassette to operate the latter in a processing and projection mode.

Assuming the exposed film strip 24 has not been processed, the player operates to initially rewind the film so that the tongue 76 of the sealing strip 64 becomes engaged by the film strip 24 after falling into the noted bottle-shaped aperture. After such engagement, the folded sealing member 72 is peeled away from the housing 42, such as best depicted in FIG. 2. During peeling, the cover tab 80 comes into progressive engagement with the wetted sealing surface 78. Continued rewinding will cause the strip member 70 including the sealing member 72 and cover tab 80 to be wound in an interleaved fashion with the film strip 24. Owing to the construction of the cover tab 80, it will function to cover the wetted sealing surface 78 and thereby substantially preclude contamination of cassette components including, of course, dry portions of the film strip 24. Thus, the wetted sealing member 72 can be wound on the supply spool 26 without the processing fluid contaminating adjacent wraps of the film strip 24. Accordingly, an extremely simple and reliable sealing device has been constructed for use in successfully releasing processing fluid and which avoids the potential problems noted earlier.

Thus, it will be appreciated that as a result of this invention, an improved sealing strip for use with fluid processors of the type contained multipurpose film cassettes is provided by which the above-mentioned objectives are completely fulfilled. Also, it will be apparent to those skilled in the art that modifications and/or changes may be made in the illustrated embodiment without departures from the inventive concepts manifested thereby. Accordingly, it is expressly intended that the foregoing description is of a preferred embodiment only, not limiting, and that the true spirit and scope of the present invention be determined by references to the appended claims.

What is claimed is:

1. In a film cassette containing photographic film strip movable in a given direction in accordance with winding of the film strip on a film spool, a fluid processor constructed to store processing fluid and having an opening allowing passage of the processing fluid for deposition onto the film strip, and a sealing strip having a sealing surface sealing the opening, the sealing strip having a leading end connectable to the film strip for movement therewith so as to release the fluid and carry the sealing strip into the spool winding for storage, the improvement comprising:

a flap portion connected to the sealing strip and arranged to overlie the sealing surface as the sealing strip is drawn toward the film spool so as to cover the sealing surface when the sealing strip is convolutely wound with the film strip and thereby preclude the processing fluid carried by the sealing surface from adversely affecting the film strip.

2. The cassette of claim 1 wherein the flap is hingedly connected to the sealing strip at a location between the sealing surface and the leading end, and the flap is of sufficient length to extend from the hinged location to or beyond the remote edge of the sealing surface.

3. The cassette of claim 2 includes means for contacting the sealing surface so as to facilitate having the flap overlie the sealing surface.

4. In a film cassette containing a photographic film strip movable in a given direction, a fluid processor constructed to store processing fluid and having an opening allowing passage of the processing fluid for deposition onto the film strip, a film spool upon which the film strip is windable, and an elongated releasable sealing strip having a folded over sealing surface sealing the opening, the sealing strip having a leading end connectable to the film strip for effecting movement thereof in response to winding movement of the film strip for peeling the folded sealing surface from the opening, the improvement comprising:

a flap portion connected to the sealing strip extending beyond the folded over sealing surface and being constructed and positioned to progressively engage and substantially cover the sealing surface as the sealing surface is peeled from the processor in response to the winding movement of the film strip so as to allow the sealing surface to be convolutely wound with the film strip on the film spool without the processing fluid adversely affecting the film strip.

5. In a fluid processor for use with a photographic film cassette containing a photographic film strip movable in a given direction in accordance with winding of the film strip on a spool, said fluid processor being constructed to store processing fluid and having an opening allowing passage of the processing fluid for deposition onto the film strip, and an elongated releasable sealing strip having a sealing surface for sealing the opening, the sealing strip having a leading end connectable to the film strip for movement therewith so as to release the sealing strip into the spool winding for storage, the improvement comprising:

a flap portion connected to the sealing strip and arranged for overlying the sealing surface as the sealing strip is drawn toward the film spool so as to substantially cover the sealing surface when the sealing strip is convolutely wound with the film strip and thereby precludes the processing fluid carried by the sealing surface from adversely affecting the film strip.

6. A releasable sealing device for use with a film cassette containing a strip of photographic film movable in a given direction and a fluid processor constructed to store processing fluid and having an opening for releasing the processing fluid onto the film strip; said sealing device made of a generally elongated sealing strip and a flap portion connected to an intermediate portion of the sealing strip in a manner for defining first and second sealing strip segments, one of said flap or said second segment having a sealing surface connected to the processor so as to seal the processing fluid in the opening and being displaceable for releasing the processing fluid from the opening in response to advancement in a given direction; the other of said flap portion or second segment constructed for overlying and subsequently generally covering said sealing surface when the sealing device is advanced in said given direction for enabling movement of said folded portion and said second segment together.

7. The method of releasing processing fluid from a fluid processor containing processing fluid in a reservoir having a sealable area sealed by a sealing surface of a displaceable sealing strip which releases the fluid onto a surface of a photographic film strip in a film cassette in response to displacement of the sealing strip in a given direction to uncover the sealing surface from the opening, the improvement comprising the step of:

substantially covering the sealing surface during displacement of the sealing strip in the given direction by a flap member connected to the sealing means in a manner which enables the flap member to progressively overlie and substantially cover the sealing surface to thereby preclude the processing fluid carried by the sealing surface contaminating the processor or the film strip.

8. The method of releasing processing fluid from a fluid processor containing processing fluid in a reservoir having a sealable area sealed by a sealing surface of a displaceable sealing strip for releasing the fluid onto a surface of a photographic film strip in a film cassette in response to displacement of the sealing strip caused by the sealing strip having a leading end cooperating and advancing with the film strip as the film strip is wound on a film spool for the film strip so that the sealing surface is uncovered from the opening, the improvement comprising the step of:

automatically covering the sealing surface during displacement of the sealing strip by the film strip by a flap member connected to the sealing device in a manner for enabling the flap member to engage progressively with and substantially cover the sealing surface.

* * * * *